United States Patent [19]

Saito et al.

[11] Patent Number: 5,179,161

[45] Date of Patent: Jan. 12, 1993

[54] AROMATIC POLYCARBONATE RESIN COMPOUNDS

[75] Inventors: Akihiro Saito; Hideyuki Itoi, both of Utsunomiya; Yumiko Yoshida, Mooka; Kazunari Inoue, Utsunomiya, all of Japan

[73] Assignee: General Electric Company, Mt. Vernon, Ind.

[21] Appl. No.: 627,150

[22] Filed: Dec. 13, 1990

[30] Foreign Application Priority Data

Dec. 26, 1989 [JP] Japan .................................. 1-335117

[51] Int. Cl.$^5$ ...................... C08L 69/00; C08L 71/08; C08L 25/08
[52] U.S. Cl. ..................... 525/133; 525/92; 525/146; 525/148; 525/394
[58] Field of Search ................ 525/133, 146, 148, 394

[56] References Cited

U.S. PATENT DOCUMENTS

| | | | |
|---|---|---|---|
| 3,963,804 | 6/1976 | Yonemitsu | 525/394 |
| 4,871,800 | 10/1989 | Fujii | 525/148 |
| 4,885,334 | 12/1989 | Mayumi | 525/68 |
| 4,895,897 | 1/1990 | Kaufman | 525/146 |

*Primary Examiner*—David J. Buttner
*Attorney, Agent, or Firm*—Martin Barancik

[57] ABSTRACT

An aromatic polycarbonate resin composition which contains
(A) 3-97 parts by weight of an aromatic polycarbonate resin in which the ratio of the phenolic terminal group represented by the following formula I:

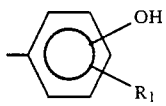

(I)

with respect to the nonphenolic terminal group represented by the following formula II:

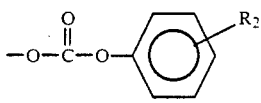

(II)

(in which $R_1$ and $R_2$, which may be identical to or different from one another, are selected from a hydrogen atom and alkyl groups containing 20 or fewer carbon atoms which may or may not be substituted with halogen atoms)
I/II is 1/19 or higher,
(B) 97-3 parts by weight of a polyphenylene ether resin, A+B=100 parts by weight, and
(C) 0.5 to 100 parts by weight, with respect to 100 parts by weight of the combined weights of (A) and (B), of a styrene copolymer which has an epxoy or oxazoline group.

13 Claims, No Drawings

AROMATIC POLYCARBONATE RESIN COMPOUNDS

DETAILED EXPLANATION OF THE INVENTION

Industrial Application Fields of the Invention

The present invention concerns a resin composition which contains an aromatic polycarbonate resin and a polyphenylene ether resin.

Conventional Technology

Since aromatic polycarbonates are resins with high mechanical strengths, they are used extensively as engineering plastics. Based on their unique properties, furthermore, attempts have been made to blend said resins with various resins.

It is a well-established fact that a polyphenylene ether ("PPE" hereafter) resin can be blended with the aromatic polycarbonate resin to elevate the heat deformation point and to alleviate cracks produced by a concentrated stress (see Japanese Kokoku patent No. Sho 42[1967]-15782).

Problems to be Solved by the Invention

The miscibility between the polycarbonate and PPE is inherently low, and when a resin composition which contains the two resins is molded, the resulting molded product fails to exhibit a sufficiently high impact strength.

The foremost objective of the present invention is to provide a molded product characterized by an improved impact strength by improving the miscibility between the polycarbonate and PPE.

Mechanism for Solving the Problems

The present inventors have discovered that the miscibility between the aromatic polycarbonate resin and PPE resin can be improved by controlling the phenolic terminal group/nonphenolic terminal group ratio of the aromatic polycarbonate resin and by adding a styrene copolymer which contains a special group. The present invention has been realized based on these discoveries.

Briefly, the present invention concerns an aromatic polycarbonate resin composition which contains (A) 3-97 parts by weight of an aromatic polycarbonate resin in which the ratio of the phenolic terminal group represented by the following formula I:

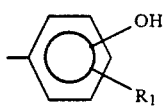 (I)

with respect to the nonphenolic terminal group represented by the following formula II:

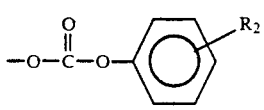 (II)

(in which $R_1$ and $R_2$, which may be identical to or different from one another, are selected from a hydrogen atom and alkyl groups containing 20 or fewer carbon atoms which may or may not be substituted with halogen atoms) (i.e., I/II) is 1/19 or higher, (B) 97-3 [sic] parts by weight of a polyphenylene ether resin, and (C) 0.5-100 parts by weight (with respect to 100 parts by weight of the combined weights of (A) and (B)) of a styrene copolymer which has an epoxy group or oxazoline group.

The aromatic polycarbonate resin which is used as component (A) of the present invention contains a main repeating unit represented by the following formula:

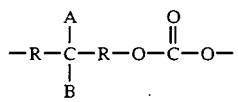

(in which the individual R groups are selected from phenylene, halogen-substituted phenylene, and $C_{1-20}$ alkyl-substituted phenylene groups; A and B are selected from a hydrogen atom, aliphatic unsaturated bond-free $C_{1-12}$ hydrocarbon groups, and groups which are capable of forming cycloalkane groups together with an adjacent carbon atom). As far as the present invention is concerned, the ratio of the phenolic terminal group I with respect to the nonphenolic terminal group II (i.e., terminal ratio) of said aromatic polycarbonate is controlled.

The terminal ratio of the aromatic polycarbonate can be easily controlled by varying the molar ratio between the feed diphenyl carbonate and diphenol (e.g., bisphenol A) in a process whereby an aromatic polycarbonate is manufactured by the transesterification method. For example, when bisphenol A and bisphenyl carbonate are transesterified, the terminal of the polycarbonate is a phenolic residue derived from bisphenol A or a phenyl group derived from diphenyl carbonate. If the molar ratio of bisphenol A is high during the transesterification process, the ratio of the phenolic terminal group increases in the product polycarbonate. The aromatic polycarbonate may also be branched. Said branched polycarbonate can be synthesized by reacting a polyfunctional aromatic compound with a diphenol and/or carbonate precursor. Thus, a branched thermoplastic randomly branched polycarbonate is obtained.

The phenolic terminal group/nonphenolic terminal group ratio of a typical conventional aromatic polycarbonate (especially an aromatic polycarbonate synthesized by the phosgene method) is 1/20 or lower. In other words, the polycarbonate is synthesized by reacting bisphenol A with phosgene. If a small quantity of phenol is added to the feed material or to the reaction mixture, the polymer terminal can be endcapped by the phenol (i.e., reacted with a hydroxyl group).

As far as the present invention is concerned, the ratio of the phenolic terminal group with respect to the nonphenolic terminal group in the aromatic polycarbonate (i.e., I/II) should be 1/19 or higher, more preferably 1/10 or higher, or most preferably 1/5 or higher and up to 1/0. If the terminal ratio is lower than 1/19, it is impossible to effectively improve the miscibility between the aromatic polycarbonate and PPE. Thus, the impact resistance of the resulting molded product is inferior.

The OH group concentration of the phenolic terminal group can be determined by measuring the absorption intensity of FTIR at 3,600 cm$^{-1}$. The total terminal group concentration can be computed based on the average particle size which has been measured based on the IV (intrinsic viscosity) measured in a methylene chloride solution. When the IV value is converted to the average particle size, Schnell's equation is used:

$$IV = 1.23 \times 10^{-4} M^{0.83}$$

(M: viscosity-based average molecular weight).

Next, various conventional resins can be used as the PPE resin which is used as component (B) of the present invention. For example, polymers represented by the following general formula:

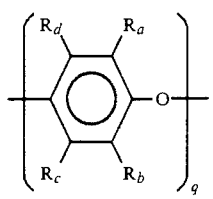

(in which $R_a$, $R_b$, $R_c$, and $R_d$, which are independent of one another, are univalent substituents which contain no tertiary α-carbon atoms selected from a hydrogen atom, halogen atoms, alkyl groups, alkoxy groups, haloalkyl groups in which at least two carbon atoms are present between a halogen atom and a phenyl ring, and haloalkoxy groups; q is an integer pertaining to the degree of polymerization). Not only homopolymers represented by the aforementioned general formula but also copolymers consisting of two or more types [of monomers] can be used. In an especially desirable example, $R_a$ and $R_b$ are alkyl groups containing 1–4 carbon atoms, and $R_c$ and $R_d$ are hydrogen atoms or alkyl groups containing 1–4 carbon atoms. Concrete examples of applicable compounds include poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, etc. As the aforementioned PPE copolymer, a copolymer which contains the aforementioned polyphenylene ether repeating unit in combination with a trialkyl-substituted phenol (e.g., 2,3,6-trimethylphenol, etc.), can be used. It is also possible to use a copolymer obtained by grafting a styrene compound with said PPE. Concrete examples of styrene compound-grafted polyphenylene ethers include copolymers obtained by graft-polymerizing styrene compounds (e.g., styrene, α-methylstyrene, vinyltoluene, chlorostyrene, etc.), with the aforementioned PPE.

When the aforementioned aromatic polycarbonate (i.e., component (A)) and PPE (i.e., component (B)) are mixed with one another in the resin composition, the quantities of component (A) and component (B) should be 3–97 parts by weight and 97–3 parts by weight, respectively. Especially desirable results are obtained if the quantities of components (A) and (B) are 20–90 parts by weight and 80–10 parts by weight, respectively.

Next, component (C) used in the present invention will be explained. The styrene copolymer which has an epoxy group or oxazoline group used as component (C) is a copolymer derived from a styrene monomer and an unsaturated monomer which has an epoxy group or oxazoline group. Concrete examples of said styrene monomers include styrene, side-chain alkyl-substituted styrenes (e.g., α-methylstyrene, α-ethylstyrene, etc.), nucleus-alkyl-substituted styrenes (e.g., vinyltoluene, p-methylstyrene, etc.), and halogenated styrenes (e.g., monochlorostyrene, dichlorostyrene, tribromostyrene, tetrabromostyrene, etc.). Of the aforementioned examples, styrene is especially desirable.

Various compounds can be used as unsaturated monomers which have epoxy groups or oxazoline groups. Concrete examples of desirable epoxy group-containing unsaturated monomers include glycidyl methacrylate, glycidyl acrylate, vinyl glycidyl ether, hydroxyalkyl (meth)acrylate glycidyl ether, polyalkylene glycol (meth)acrylate glycidyl ether, glycidyl itaconate, etc. Compounds represented by the following general formula:

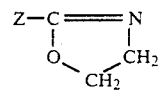

are especially desirable as oxazoline group-containing unsaturated monomers (in which Z is a polymerizable double bond). The following are examples of desirable substituents corresponding to Z:

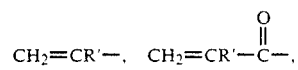

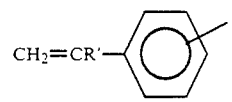

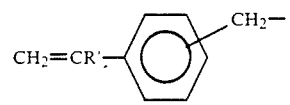

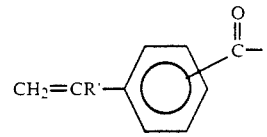

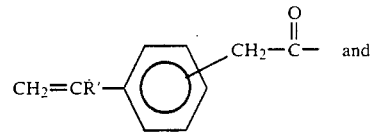

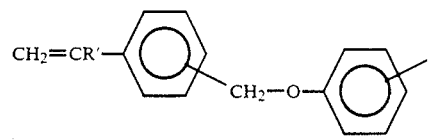

In the foregoing formulas, R' is selected from a hydrogen atom and alkyl or alkoxy groups containing 1–6 carbon atoms (e.g., methyl, iso- and n-propyl groups, and butyl group).

Vinyl oxazolines represented by the following general formula:

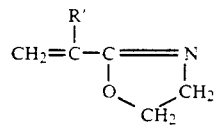

are especially desirable as the aforementioned compound. R' is the same as the aforementioned definition (especially a hydrogen atom or methyl group).

The copolymer used as component (C) may also contain a monomer component which can be copolymerized with the aforementioned unsaturated monomers containing epoxy groups or oxazoline groups. Concrete examples of such monomer components include α-olefin components (e.g., ethylene, propylene, 1-butene, 1-pentene, 4-methyl-1-pentene, 1-hexene, 1-octene, 1-decene, 1-tetradecene, 1-hexadecene, 1-octadecene, 1-eicosene, etc.), diene components (e.g., butadiene, isoprene, 1,4-hexadiene, 5-ethylidene-2-norbornene, 5-vinyl-2-norbornene, etc.), unsaturated carboxylic acids and their derivatives (e.g., vinyl acetate, acrylic acid (or its salts), methacrylic acid (or its salts), acrylic acid esters, methacrylic acid esters, maleic acid (anhydride), maleic acid esters, 2-norbornene-5,6-dicarboxylic acid (anhydride), etc.), cyanovinyl monomers (e.g., acrylonitrile, etc.), etc.

The copolymer used as component (C) may contain both an epoxy group and an oxazoline group.

A glycidyl methacrylate (GMA)/styrene copolymer and a vinyl oxazoline/styrene copolymer are especially desirable as the copolymer corresponding to component (C).

The quantity of component (C) with respect to 100 parts by weight of the combined weights of the aforementioned components (A) and (B) must be 0.5-100 parts by weight, preferably 1-40 parts by weight. If the added quantity is too small, it is impossible to effectively improve the miscibility between the aromatic polycarbonate and PPE. If the added quantity is too large, on the other hand, the heat resistance deteriorates The composition of the present invention may also contain no more than 80 parts by weight of a rubbery substance with respect to 100 parts by weight of the combined weights of components (A) and (B) as an optional component for further improving the impact strength.

As said rubbery substance, natural and synthetic polymers which are elastomeric at room temperature can be used. Concrete examples of such polymers include natural rubber, butadiene polymer, styrene-isoprene copolymer, butadiene-styrene copolymer (including a random copolymer, block copolymer, and a graft copolymer), isoprene polymer, chlorobutadiene polymer, butadiene-acrylonitrile copolymer, isobutylene polymer, isobutylene-butadiene copolymer, isobutylene-isoprene copolymer, acrylic acid ester polymer, ethylene-propylene copolymer, ethylene-propylene-diene copolymer, thiocol rubber, polysulfide rubber, polyurethane rubber, polyether rubber (e.g., polypropylene oxide, etc.), epichlorohydrin rubber, etc.

The aforementioned rubbery substances can be manufactured by any conceivable polymerization technique (e.g., emulsion polymerization, solution polymerization, etc.) in the presence of any catalysts (e.g., peroxides, trialkylaluminum, lithium halide, nickel catalyst, etc.). These rubbery substances may have various crosslinking densities, various microscopic structures (e.g., cis structure, trans structure, vinyl group, etc.), and/or various average rubber particle sizes. Said copolymers may be random copolymers, block copolymers, or graft copolymers. When the aforementioned rubbery substances are prepared, furthermore, other monomers (e.g., olefins, dienes, aromatic vinyl compounds, acrylic acid, acrylic acid esters, methacrylic acid esters, etc.), may be copolymerized. When these monomers are copolymerized, any conceivable copolymerization techniques (e.g., random copolymerization, block copolymerization, graft copolymerization, etc.) can be used. Concrete examples of the aforementioned monomers include ethylene, propylene, styrene, chlorostyrene, α-methylstyrene, butadiene, isobutylene, chlorobutadiene, butene, isobutylene, methyl acrylate, acrylic acid, ethyl acrylate, butyl acrylate, methyl methacrylate, acrylonitrile, etc. Partially-modified rubbery substances can also be used. Concrete examples of such polymers include hydroxy or carboxy terminal-modified polybutadiene, partially hydrogenated styrene-butadiene block copolymer, partially hydrogenated styrene-isoprene block copolymer, etc.

Modified polyolefins can be used as rubbery substances. For example, modified polyolefins obtained by introducing monomer components containing at least one functional group selected from carboxylic acid groups, carboxylic anhydride groups, imido groups, epoxy groups, and oxazoline groups ("functional group-containing component" hereafter) to polyolefins which have been obtained by radical-polymerizing at least one type of olefin selected from ethylene, propylene, 1-butene, 1-pentene, 4-methyl-1-pentene, isobutylene, 1,4-hexadiene, dicyclopentadiene, 2,5-norbornadiene, 5-ethylidenenorbornene, 5-ethyl-2,5-norbornadiene, 5-(1,-propenyl)-2-norbornene, and styrene can be appropriately used.

Concrete examples of functional group-containing compounds include acrylic acid, methacrylic acid, maleic acid, fumaric acid, itaconic acid, crotonic acid, methylmaleic acid, methylfumaric acid, mesaconic acid, citraconic acid, glutaconic acid, metal salts of the aforementioned carboxylic acids, methyl hydrogen maleate, methyl hydrogen itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, maleic anhydride, itaconic anhydride, citraconic anhydride, endobicyclo-(2,2,1)-5-heptene-2,3-dicarboxylic acid, endobicyclo-(2,2,1)-5-heptene-2,3-dicarboxylic anhydride, maleimide, N-ethylmaleimide, N-butylmaleimide, N-phenylmaleimide, glycidyl methacrylate, glycidyl acrylate, vinyl glycidyl ether, glycidyl itaconate, hydroxyalkyl (meth)acrylate glycidyl ether, polyalkylene glycol (meth)acrylate glycidyl ether, vinyloxazoline, etc.

There are no special restrictions on the procedures for introducing the aforementioned functional group-containing components. For example, they may be mixed and copolymerized with the main olefin component. Moreover, said components may be grafted with polyolefins using radical generators. The quantity of the introduced functional group-containing component with respect to the modified polyolefin weight should be 0.001-40 mol %, preferably 0.01-35 mol %.

Concrete examples of especially desirable modified polyolefins include an ethylene-acrylic acid copolymer, ethylene-methacrylic acid copolymer, corresponding copolymers in which the carboxylic acid components have been partially or entirely converted to sodium, lithium, potassium, zinc, and/or calcium salts, ethylene-methyl acrylate copolymer, ethylene-ethyl acrylate copolymer, ethylene-methyl methacrylate copolymer, ethylene-ethyl methacrylate copolymer, ethylene-ethyl acrylate-g-maleic anhydride copolymer ("g" means "graft," same in subsequent references), ethylene-methacrylic acid-g-maleic anhydride copolymer, ethylene-ethyl acrylate-g-maleimide copolymer, ethylene-ethyl acrylate-g-N-phenylmaleimide copolymer, partial saponification products of the aforementioned copolymers, ethylene-propylene-g-maleic anhydride copolymer, ethylene-butene-1-g-maleic anhydride copolymer, ethylene-propylene-1,4-hexadiene-g-maleic anhydride copolymer, ethylene-propylene-dicyclopentadiene-g-maleic anhydride copolymer, ethylene-propylene-2,5-norbornadiene-g-maleic anhydride copolymer, ethylene-propylene-g-N-phenylmaleimide copolymer, ethylene-butene-1-g-N-phenylmaleimide copolymer, ethylene-glycidyl (meth)acrylate copolymer, ethylene-acrylic acid-glycidyl (meth)acrylate copolymer, etc. The aforementioned polymers may be used either singly or in combination.

In addition to the aforementioned components, furthermore, the resin composition of the present invention may also contain no more than 100 parts by weight of styrene resins which have no epoxy groups or oxazoline groups as optional components with respect to 100 parts by weight of the combined weights of components (A) and (B).

Various resins or additives (e.g., pigments, dyes, reinforcements, fillers, heat resistance enhancers, antioxidants, weather resistance enhancers, lubricants, mold-release agents, crystalline nucleating agents, plasticizers, fluidity enhancers, antistatic agents, etc.), may be mixed with the resin composition of the present invention as long as they exert no adverse effects on the physical properties of said composition.

Concrete examples of reinforcing fillers include finely pulverized aluminum, iron, nickel, etc., metal oxides, nonmetals (e.g., carbon filament, silicates (e.g., mica, aluminum silicate (clay), talc, asbestos, etc.), titanium dioxide, silica-lime, novaculite, potassium titanate, titanate whiskers, glass flakes, glass beads, glass fibers, and polymer fibers. These fillers may be used either singly or in combination.

The quantities of the aforementioned reinforcing fillers should be selected so that adequate reinforcing effects will be attained. Under normal circumstances, the quantity of addition with respect to the total weight of the composition should be 1-60 wt %, preferably 5-50 wt %. Glass is the most desirable reinforcement.

If the composition of the present invention contains a polycarbonate consisting of brominated bisphenol, an inorganic or organic antimony-containing compound may be added to the composition of the present invention in order to synergistically enhance the flame retardance of the composition.

Concrete examples of compounds which can be used as stabilizers or antioxidants include [sterically] hindered phenols, phosphites, metal phosphates, metal phosphites, etc.

When the resin composition of the present invention is manufactured, the individual components are mixed by conventional procedures. For example, said components are dispersed and mixed using a high-speed mixer (e.g., tumble mixer, Henschell mixer, ribbon blender, supermixer, etc.). Then, the resulting mixture is melt-mixed using an extruder, Banbury mixer, roll, etc.

APPLICATION EXAMPLES

The aromatic polycarbonate of the present invention used in the following application examples (i.e., component (A)) was obtained by transesterifying diphenyl carbonate and bisphenol A. The specific viscosity of said polymer, which was measured in methylene chloride at 25° C., was 0.50 dL/g. The molar ratio between the diphenyl carbonate and bisphenol A was controlled so that the phenolic terminal group/nonphenolic terminal group ratio would be approximately 3/7 or 1/1. The resulting polymers were termed as PC(30) and PC(50), respectively.

For comparative purposes, an aromatic polycarbonate with a phenolic terminal group ratio of approximately 1/99 obtained by polymerizing bisphenol A by the phosgene method and by endcapping the terminal of the resulting polymer using a phenyl group (Lexan 141, trademark of General Electric Co.; intrinsic viscosity in methylene chloride at 25° C.: 0.51 dL/g) was used. Said polymer was termed as PC(1).

Noryl (trademark of Nippon GE Plastics Co., Ltd.) was used as a PPE to be used as component (B).

CX-RPS-1005 (trademark of Nippon Shokubai Kagaku Kogyo Co.; 5 wt % oxazoline compound-containing styrene copolymer) [or] CP-1005S (trademark of Nippon Oils & Fats Co.; 5 wt % glycidyl methacrylate-containing styrene copolymer) [was] used as component (C).

SEBS (partially hydrogenated styrene-butadiene block copolymer; "Kraton G1651," trademark of Shell Chemical Co.) was used as a rubbery substance (i.e., optional component).

APPLICATION EXAMPLES 1-4 AND COMPARATIVE EXAMPLES 1-8

After the components shown in the table were melt-mixed in a 50 mm biaxial extruder at a temperature of 280° C. and at a rotation frequency of 290 rpm at the ratio (weight ratio) shown in said table, a pellet was obtained. The Izod impact strength (with a notch) was measured using the resulting pellet. The Izod impact strength (with a ¼" notch) was measured according to the procedures specified in ASTM D 256. The results are summarized in the table.

TABLE

|  | EXAMPLES | | | | COMPARISON EXAMPLES | | | | | | | |
|---|---|---|---|---|---|---|---|---|---|---|---|---|
|  | 1 | 2 | 3 | 4 | 1 | 2 | 3 | 4 | 5 | 6 | 7 | 8 |
| COMPONENTS | | | | | | | | | | | | |
| (A) AROMATIC POLYCARBONATE (PC) | | | | | | | | | | | | |
| PC (1) |  |  |  |  | 60 |  | 60 |  |  | 60 | 60 | 60 |
| PC (30) |  |  |  | 60 |  |  |  | 60 |  |  |  |  |
| PC (50) | 60 | 60 | 60 |  |  | 60 |  |  | 60 |  |  |  |
| (B) PPE | 40 | 30 | 30 | 30 | 40 | 40 | 30 | 30 | 30 | 40 | 30 | 30 |
| (C) CX-RPS-1005 | 5 | 5 |  | 5 |  |  |  |  |  | 5 | 5 |  |
| CP-1005S |  |  | 5 |  |  |  |  |  |  |  |  | 5 |
| OPTIONAL COMPONENT SEBS |  | 10 | 10 | 10 |  |  | 10 | 10 | 10 |  | 10 | 10 |

TABLE-continued

| | EXAMPLES | | | | COMPARISON EXAMPLES | | | | | | | |
|---|---|---|---|---|---|---|---|---|---|---|---|---|
| | 1 | 2 | 3 | 4 | 1 | 2 | 3 | 4 | 5 | 6 | 7 | 8 |
| NOTCHED IZOD (kg · cm/cm) | 9.1 | 46 | 43 | 42 | 5.2 | 5.0 | 15.8 | 16.5 | 16.0 | 2.0 | 3.0 | 2.8 |

EFFECTS OF THE INVENTION

The impact strength of a molded product derived from the resin composition of the present invention is significantly improved since the miscibility between the aromatic polycarbonate and PPE resin is excellent. As a result, application possibilities are expanded, which is valuable from an industrial point of view.

What is claimed is:

1. An aromatic polycarbonate resin composition which contains
   (A) 3-97 parts by weight of an aromatic polycarbonate resin in which the ratio of the phenolic terminal group represented by the following formula I:

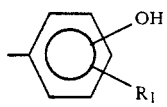

with respect to the nonphenolic terminal group represented by the following formula II:

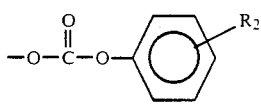

(in which $R_1$ and $R_2$, which may be identical to or different from one another, are selected from a hydrogen atom and alkyl groups containing 20 or fewer carbon atoms which may or may not be substituted with halogen atoms)
   I/II is 1/19 or higher,
   (B) 97-3 parts by weight of a polyphenylene ether resin, A+B=100 parts by weight, and
   (C) 0.5 to 100 parts by weight, with respect to 100 parts by weight of the combined weights of (A) and (B), of a styrene copolymer which has an oxazoline group.

2. The composition in accordance with claim 1 wherein the ratio I/II is 1/10 or higher.

3. The composition in accordance with claim 1 wherein the ratio of I/II is 1/5 or higher.

4. The composition in accordance with claim 1 wherein A is from 20-90 and B is 80-10 parts by weight.

5. The composition in accordance with claim 1 wherein the styrene copolymer is prepared from an unsaturated monomer having an oxazoline group.

6. The composition in accordance with claim 2 wherein A is from 20-90 and B is from 80-10 parts by weight.

7. The composition in accordance with claim 4 wherein C is from 1 to 40 parts by weight.

8. An aromatic polycarbonate resin composition which contains
   (A) 3-97 parts by weight of an aromatic polycarbonate resin in which the ratio of the phenolic terminal group represented by the following formula I:

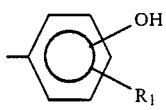

with respect to the nonphenolic terminal group represented by the following formula II:

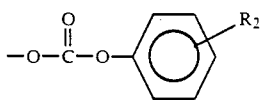

(in which $R_1$ and $R_2$, which may be identical to or different from one another, are selected from a hydrogen atom and alkyl groups containing 20 or fewer carbon atoms which may or may not be substituted with halogen atoms)
   I/II is 1/19 or higher,
   (B) 97-3 parts by weight of a polyphenylene ether resin, A+B=100 parts by weight, and
   (C) 0.5 to 100 parts by weight, with respect to 100 parts by weight of the combined weights of (A) and (B), of a styrene copolymer which is prepared from an unsaturated monomer having an epoxy group with the proviso that rubbery block copolymers are excluded.

9. The composition in accordance with claim 8 wherein the ratio I/II is 1/10 or higher.

10. The composition in accordance with claim 8 wherein the ratio of I/II is 1/5 or higher.

11. The composition in accordance with claim 8 wherein A is from 20-90 and B is 80-10 parts by weight.

12. The composition in accordance with claim 9 wherein A is from 20-90 and B is from 80-10 parts by weight.

13. The composition in accordance with claim 11 wherein C is from 1 to 40 parts by weight.

* * * * *